United States Patent
Murase et al.

(10) Patent No.: US 7,465,761 B2
(45) Date of Patent: Dec. 16, 2008

(54) FLAME RETARDANT COMPOSITION WITH IMPROVED FLUIDITY, FLAME RETARDANT RESIN COMPOSITION AND MOLDED PRODUCTS

(75) Inventors: Hisashi Murase, Saitama (JP); Masaru Nagahama, Saitama (JP); Kenichi Yoshikawa, Saitama (JP); Yuki Tanaka, Saitama (JP); Takayoshi Kaneda, Saitama (JP); Akihiro Yamaki, Saitama (JP)

(73) Assignee: Adeka Corporation, Tokyo (JP)

( * ) Notice: Subject to any disclaimer, the term of this patent is extended or adjusted under 35 U.S.C. 154(b) by 292 days.

(21) Appl. No.: 10/590,350

(22) PCT Filed: Feb. 22, 2005

(86) PCT No.: PCT/JP2005/003260

§ 371 (c)(1), (2), (4) Date: Aug. 23, 2006

(87) PCT Pub. No.: WO2005/080494

PCT Pub. Date: Sep. 1, 2005

(65) Prior Publication Data

US 2007/0176154 A1  Aug. 2, 2007

(30) Foreign Application Priority Data

Feb. 24, 2004  (JP) ............................. 2004-048664

(51) Int. Cl.
*C08K 3/3462* (2006.01)
*C08K 5/3492* (2006.01)

(52) U.S. Cl. ...................................... 524/100; 524/140
(58) Field of Classification Search ................. 525/100, 525/140

See application file for complete search history.

(56) References Cited

U.S. PATENT DOCUMENTS 3,810,850 A * 5/1974 Rowton ....................... 521/163

FOREIGN PATENT DOCUMENTS

WO  WO 03/018680 A2  3/2003

* cited by examiner

*Primary Examiner*—Peter Szekely
(74) *Attorney, Agent, or Firm*—Millen, White, Zelano, Branigan, P.C.

(57) ABSTRACT

The invention provides a flame retardant composition comprising 1-99 weight parts of a salt of piperazine and an inorganic compound selected from among piperazine phosphate, piperazine pyrophosphate and piperazine polyphosphate, or a mixture of two or more of these piperazine salts (ingredient (A)), 99-1 weight parts of a salt of melamine and an inorganic compound selected from among melamine phosphate, melamine pyrophosphate and melamine polyphosphate, or a mixture of two or more of these melamine salts (ingredient (B)) (wherein, the sum of ingredient (A) and ingredient (B) is 100 weight parts), 0-50 weight parts of an arbitrary ingredient (ingredient (C)), and 0.01-20 weight parts of a silicone oil having a viscosity at 25° C. of 5000 mm$^2$/s (ingredient (D)) which is added thereto. This flame retardant not only has superior flame retarding properties, but also has enhanced powder properties and anti-hygroscopic properties, and when it is added to a resin, there is little change of electrical resistance.

19 Claims, 1 Drawing Sheet

Splash degree test apparatus and test method

US 7,465,761 B2

FLAME RETARDANT COMPOSITION WITH IMPROVED FLUIDITY, FLAME RETARDANT RESIN COMPOSITION AND MOLDED PRODUCTS

FIELD OF THE INVENTION

The present invention relates to a flame retardant composition comprising piperazine and melamine treated by silicone oil, to a (poly/pyro)phosphate compound, and in particular to an inorganic phosphorus type flame retardant containing little amount of secondary aggregation which has superior powder properties, superior water resistance and superior dispersibility in resin due to the addition of silicone oil.

BACKGROUND OF THE INVENTION

Synthetic resins have long been widely used for building materials, automobile parts, packaging materials, agricultural materials, housing materials for home electronics and toys due to their chemical and mechanical properties. However, many synthetic resins are combustible, and depending on their use, they did not have sufficient flame-retarding properties. Flame retarding properties may be conferred by inorganic phosphorus flame retardants, e.g., halogen flame retardants, red phosphorus or polyphosphate type flame retardants such as ammonium polyphosphate, organic phosphorus type flame retardants such as triaryl phosphate esters, metal hydroxides or antimony oxide which is a flame retarding auxiliary agent, and melamine compounds. The use of these substances, alone or in combination, is well-known.

Among these, halogen flame retardants have a superior flame retarding effect, but since they generate toxic substances such as hydrogen halide gases and dioxin during combustion, a flame retarding method which did not use a halogen flame retardant was desired. In the case of metal hydroxides such as magnesium hydroxide, a flame retarding effect was not obtained unless a large amount was used, so the workability of the resin and the physical properties of molded items produced from it were impaired. In the case of phosphorus flame retardants, phosphate esters which are excellent for conferring flame retarding properties on polycarbonates, and inorganic phosphorus flame retardants which are excellent for conferring flame retarding properties on polyolefins, are used. Inorganic phosphorus flame retardants such as ammonium polyphosphate, useful for conferring flame retarding properties on polyolefins which are general-purpose resins, are easy to form a secondary aggregation and interfere with their dispersion in the resin, therefore, when the resin is molded into films or fibers, the molding apt to have defects. Also ammonium polyphosphate hydrolyzes, so its hygroscopic properties had to be reduced.

As a means to control the aggregation and hygroscopic properties of ammonium polyphosphate, which is an inorganic phosphorus flame retardant, Japanese Unexamined Patent Publication tokkai-syo 61-98722 (refer to claims) discloses a polyurea coating, tokkai-syo 61-103962 (refer to claims) discloses a melamine/formaldehyde resin coating, tokkai-hei 3-131508 (refer to claims) discloses a curable silicone resin coating, European Patent No. 93993 (refer to claims, in particular claim ) discloses an epoxy resin coating, and Japanese Unexamined Patent Publication tokkai-hei 8-134455 (refer to claims) discloses the blending of microfine silica coated with a silicone oil.

However, in the aforesaid coating method proposed by tokkai-hei 3-131508, the flame retardant is treated in an organic solvent, so manufacturing costs are high, and solvent and effluent treatment are also required. Therefore, a treatment method which could be performed without a solvent was desired.

In Japanese Unexamined Patent Publication tokkai 2003-26935 (refer to claims), it is stated that a superior flame retarding effect is achieved with only a small amount of flame retardant by concurrent use of complex salt of polyphosphoric acid, melamine and piperazine with a drip inhibitor. Since this flame retardant not only had a superior flame retarding effect but also superior water resistance, it was easy to handle compared with ammonium polyphosphate.

However, in resins which had been treated with the flame retardant described in tokkai 2003-26935 (refer to claims), the electrical resistance decreased with time considerably, so it could not be used for applications in which stable electrical properties were required.

As an efficient surface treatment method, tokkai 2000-63842 (refer to claims) proposes modifying the surface of ammonium polyphosphate and melamine polyphosphate flame retardants by applying a solvent containing composition of a silicon containing coating agent or a water-soluble organopolysiloxane to the flame retardant particles. However, there is no mention of piperazine polyphosphate, nor any postulation that the flame retardant obtained by combining piperazine polyphosphate and melamine polyphosphate offered superior flame retarding properties when treated with silicone oil, nor that the flame retardant can be obtained without impairing the electrical properties of the blended resin.

SUMMARY OF THE INVENTION

Therefore, a flame retardant was desired which not only had superior flame retarding properties, but also had improved powder properties and hygroscopic properties, and caused only a small change of electrical resistance when added to a resin.

The Inventors found, from the results of intensive studies carried out in view of this situation, that an inorganic flame retardant having suppressed secondary aggregation, superior powder properties and suppressed hygroscopic properties could be prepared by adding a silicone oil to a mixture of a salt of piperazine with an inorganic phosphorus compound, and a salt of melamine with an inorganic phosphorus compound, and also found that the electrical resistance of the resin to which this flame retardant was added remained stable over time. They thereby arrived at the present invention.

Namely, the first invention provides a flame retardant composition obtained from 1-99 weight parts of a salt of piperazine and an inorganic phosphorus compound selected from among piperazine phosphate, piperazine pyrophosphate and piperazine polyphosphate, or a mixture of two or more of these piperazine salts (ingredient (A)), 99-1 weight parts of a salt of melamine and an inorganic phosphorus compound (ingredient (B)) selected from among melamine phosphate, melamine pyrophosphate and melamine polyphosphate, or a mixture of two or more of these melamine salts, (wherein, the sum total of ingredient (A) and ingredient (B) is 100 weight parts), and 0-50 weight parts of an arbitrary ingredient (ingredient (C)), to which 0.01-20 weight parts of a silicone oil (ingredient (D)) having a viscosity at 25° C. of 5000 mm$^2$/s or less is added and treated.

The second invention provides the first flame retardant composition wherein 80 weight % or more of the salt of piperazine and the inorganic phosphorus compound (ingredient (A)) is piperazine pyrophosphate, 80 weight % or more of the salt of melamine and the inorganic phosphorus compound (ingredient (B)) is melamine pyrophosphate, and the arbitrary ingredient (C)) is 10 weight parts or less relative to the sum of 100 weight parts of ingredient (A) and (B).

The third invention provides the first or second flame retardant composition wherein the silicone oil (ingredient (D)) is methylhydrogen polysiloxane.

The fourth invention provides any of the first-third flame retardant compositions wherein, as the silicone oil (ingredient (D)), a silicone oil having only a methylhydrogen polysiloxane structure is used concurrently with a silicone oil at least partly having a dimethylpolysiloxane structure.

The fifth invention provides any of the first-fourth flame retardant compositions wherein the silicone oil (ingredient (D)) has a viscosity of 1000 mm$^2$/s at 25° C.

The sixth invention provides a flame retardant polyolefin resin composition obtained by blending any of the first-fifth flame retardant compositions in the proportion of 3-70 weight parts relative to 100 weight parts of a polyolefin resin.

The seventh invention provides a flame retardant polyolefin resin composition molded product obtained by molding the sixth flame retardant polyolefin resin composition of the invention.

Due to this invention, an inorganic phosphorus flame retardant having excellent dispersibility in resins and anti-hygroscopic properties, can be obtained. Also, by adding the flame retardant composition of the invention to a synthetic resin, a resin composition, and particularly a flame retardant polyolefin resin composition having flame-retarding properties as well as sustained electrical resistance can be obtained, so polyolefin resin molded products can now be used in applications where flame-retarding properties are required.

DESCRIPTION OF THE PREFERRED EMBODIMENTS

Figure 1:
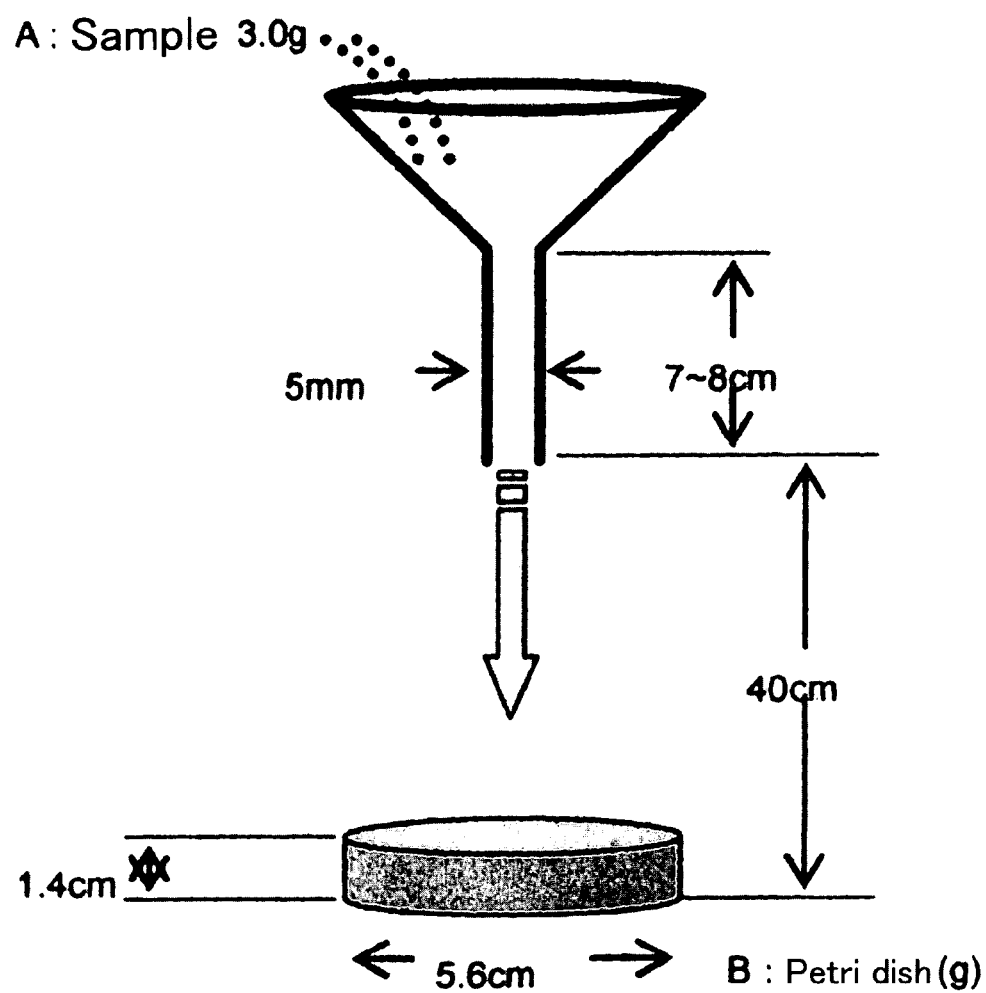
FIG. 1 is a diagram figure showing a splash degree test apparatus used in a splash degree test method according to the invention.

Hereafter, some embodiments of the invention will be described.

The salt of piperazine and an inorganic phosphorus compound which is ingredient (A) of the invention is selected from among piperazine phosphate, piperazine pyrophosphate and piperazine polyphosphate, these being used alone or in combination.

The blending ratio of piperazine and inorganic phosphorus compound (composition ratio of ingredient (A)) is not particularly limited provided that it is within the range wherein a flame retarding effect is obtained, but the molar ratio of nitrogen atoms in the piperazine and phosphorus atoms in the inorganic phosphorus compound is preferably 1:5~5:1, and more preferably 1:2~2:1.

The salt of melamine and inorganic phosphorus compound which is ingredient (B) in this invention, is selected from among melamine phosphate, melamine pyrophosphate and melamine polyphosphate, these being used alone or in combination.

The blending ratio of melamine and inorganic phosphorus compound is not particularly limited provided it is within the range wherein a flame retarding effect is obtained, but the molar ratio of the nitrogen atoms of melamine to the phosphorus atoms of the inorganic phosphorus compound is preferably 1:5~5:1, and more preferably 1:3~3:1.

The viscosity at 25° C. of the silicone oil which is ingredient (D) in this invention is not particularly limited provided that it is 5000 mm$^2$/s or less, but it is preferably 3000 mm$^2$/s or less, and more preferably 1000 mm$^2$/s. If a silicone oil having a viscosity larger than 5000 mm$^2$/s is used, the suppression of secondary aggregation and improvement of waterproofing properties is small, and the electrical resistance maintenance effect is also small. Ingredient (D) is preferably used in the proportion of 0.01-20 weight parts, but more preferably 0.1-10 weight parts, relative to a composition comprising a total of 100 weight parts of ingredient (A) and ingredient (B), and 0-50 weight parts of ingredient (C).

The silicone oil having a methyl polysiloxane structure may have only a dimethyl polysiloxane structure, may include both a dimethyl polysiloxane structure and a methylhydrogen polysiloxane structure, or may have only a methylhydrogen polysiloxane structure, but silicone oils having a methylhydrogen polysiloxane structure are particularly superior as regards improvement of the powder properties of the flame retardant, and are therefore preferred. The silicone oil may be epoxy-modified, carboxyl-modified, carbinol-modified and/or amino-modified.

Since the silicone oil having only a dimethylsiloxane structure very effectively reduces the splash degree of fine particles and improves the work environment, its concurrent use with a silicone oil having a methylhydrogen structure is preferred as regards the quality of flame retardant finished products.

The molecular weight is not particularly limited, provided that it is a silicone oil having the aforesaid preferred viscosity.

The method of adding the silicone oil is not particularly limited, e.g., the flame retardant powder and silicone oil may be stirred together at 100-150° C., whereby a flame retardant composition with suppressed secondary aggregation, superior flame retarding effect and suppression of adverse effect on electrical resistance, is obtained. Other addition methods are spray drying addition and mixing, mixing granulation, coating, dispersion and kneading at 100-150° C.

As the silicone oil having a 100% methylhydrogen structure, KF-99 (product of Shin-Etsu Chemical Co.: viscosity 20 mm$^2$/s may be used. If it has a partly methylhydrogen structure, HMS-151 (product of Gelest Co.: viscosity 25-35 mm$^2$/s), HMS-071 (product of Gelest Co.: viscosity 25-35 mm$^2$/s), HMS-301 (product of Gelest Co.: viscosity 25-35 mm$^2$/s), or DMS-H21 (product of Gelest Co.: viscosity 100 mm$^2$/s) may be used. If it is an epoxy-modified product, X-22-2000 (product of Shin-Etsu Chemical Co.: viscosity 190 mm$^2$/s) or KF-102 (product of Shin-Etsu Chemical Co.: viscosity 4000 mm$^2$/s) may for example be used. If it is carboxyl-modified, X-22-4015 (product of Shin-Etsu Chemical Co.: viscosity 130 mm$^2$/s) may for example be used. If it is carbinol-modified, X-22-4015 (product of Shin-Etsu Chemical Co.: viscosity 2000 mm$^2$/s) may be used. If it is amino-modified, KF-393 (product of Shin-Etsu Chemical Co.: viscosity 20 mm$^2$/s), may for example be used.

As the arbitrary ingredient (C), other flame retardants and flame retarding auxiliary agents, as well as antioxidants such as a phenolic antioxidant, phosphorus antioxidant or sulfur antioxidant; weather resistance enhancers such as an ultraviolet absorber or hindered amine compound; and resin compounding agents, such as a nucleating agent, heavy metal deactivator, metal soap, hydrotalcites, bulking agent, antistatic agent, lubricant, pigment, antibacterial agent, antifungal agent and antivermin agent, may be blended with the flame retarding composition of the invention.

When ingredient (C) is blended therewith, the total amount of one or more of the ingredients (C) is preferably 10 weight parts or less, relative to a sum total of 100 weight parts of ingredient (A) and ingredient (B).

The other flame retardant mentioned above may be a halogen flame retardant, phosphoric acid ester flame retardant, ammonium polyphosphate, or metal hydroxide such as magnesium hydroxide and aluminum hydroxide.

The flame retarding auxiliary agent mentioned above may be an inorganic flame retardant or an organic flame retardant. Examples of an inorganic flame retardant are inorganic compounds such as zinc oxide, titanium oxide, aluminum oxide, magnesium oxide, magnesium hydroxide, hydrotalcite or talc, and products manufactured by surface treatment thereof, e.g., various commercial products such as a type of zinc oxide (product of Mitsui Mining Co. Ltd.), partially coated zinc oxide (product of Mitsui Mining Co. Ltd.), Nano Fine-50 (ultra-fine particulate zinc oxide with average particle diameter of 0.02 μm: Sakai Chemical Industries Ltd.), Nano Fine K (ultra-fine particulate zinc oxide with average particle diameter of 0.02 μm coated with zinc silicate: Sakai Chemical Industries Ltd.), TIPAQUE R-680 (titanium oxide: Ishihara Sangyo Co., Ltd.), Kyowa Mag 150 (magnesium oxide: product of Kyowa Chemical Industries Ltd.), DHT-4A (hydrotalcite: product of Kyowa Chemical Industries Ltd.), Alkamizer 4 (zinc-modified hydrotalcite: product of Kyowa Chemical Industries Ltd.), and Kisma 5A (magnesium hydroxide: product of Kyowa Chemical Industries Ltd.).

Examples of an organic flame retardant are melamine cyanurate, pentaerythritol and polytetrafluoroethylene.

These flame retarding auxiliary agents may be used alone, or used together. If a flame retarding auxiliary agent is also used, the blending amount of flame retardant can be reduced and flame retarding properties are obtained which are not possible if the flame retardant alone is used, so a suitable amount of the auxiliary agent is preferably used together therewith depending on the type and intended application of the resin with which the flame retardant is blended. In this regard, drip inhibitors such as polytetrafluoroethylene have a superior flame retarding effect, and are therefore preferred. The particle size, melting point and viscosity of the flame retarding auxiliary agent are selected so as to obtain a superior flame retarding effect or powder properties.

Examples of a phenolic antioxidant are 2,6-di-t-butyl-p-cresol, 2,6-diphenyl-4-octadecyloxyphenol, distearyl (3,5-di-t-butyl-4-hydroxybenzyl) phosphonate, 1,6-hexamethylene bis [(3,5-di-t-butyl-4-hydroxyphenyl) propionic acid amide], 4,4'-thio bis (6-t-butyl-m-cresol), 2,2'-methylene bis (4-methyl-6-t-butylphenol), 2,2'-methylenebis (4-ethyl-6-t-butylphenol), 4,4'-butylidene bis (6-t-butyl-m-cresol), 2,2'-ethylidene bis (4,6-di-t-butylphenol), 2,2'-ethylidene bis (4-s-butyl-6-t-butylphenol), 1,1,3-tris (2-methyl-4-hydroxy-5-t-butylphenyl) butane, 1,3,5-tris (2,6-dimethyl-3-hydroxy-4-t-butyl benzyl) isocyanurate, 1,3,5-tris (3,5-di-t-butyl-4-hydroxybenzyl)isocyanurate, 1,3,5-tris (3,5-di-t-butyl-4-hydroxybenzyl)-2,4,6-trimethylbenzene, 2-t-butyl-4-methyl-6-(2-acryloyloxy-3-t-butyl-5-methylbenzyl) phenol, stearyl (3,5-di-t-butyl-4-hydroxyphenyl) propionate, tetrakis [3-(3,5-di-t-butyl-4-hydroxyphenyl) methyl propionate] methane, thiodiethylene glycol bis [(3,5-di-t-butyl-4-hydroxyphenyl) propionate, 1,6-hexamethylene bis [(3,5-di-t-butyl-4-hydroxyphenyl) propionate], bis 3,3-[bis(4-hydroxy-3-t-butylphenyl)butyric acid] glycol ester, bis [2-t-butyl-4-methyl-6-(2-hydroxy-3-t-butyl-5-methylbenzyl) phenyl] terephthalate, 1,3,5-tris [(3,5-di-t-butyl-4-hydroxyphenyl) propionyloxyethyl] isocyanurate, 3,9-bis [1,1-dimethyl-2-{(3-t-butyl-4-hydroxy-5-methylphenyl) propionyloxy}ethyl]-2,4,8,10-tetraoxa spiro[5,5]undecane or triethylene glycol bis [(3-t-butyl-4-hydroxy-5-methylphenyl) propionate].

Examples of a phosphorus antioxidant are phosphites such as tris nonylphenyl phosphite, tris[2-t-butyl-4-(3-t-butyl-4-hydroxy-5-methylphenyl thio)-5-methylphenyl] phosphite, tridecyl phosphite, octyl diphenyl phosphite, di(decyl) monophenyl phosphite, di (tridecyl) pentaerythritol diphosphite, di (nonylphenyl) pentaerythritol diphosphite, bis (2,4-di-t-butylphenyl) pentaerythritol diphosphite, bis (2,6-di-t-butyl-4-methylphenyl) pentaerythritol diphosphite, bis (2,4,6-tritertiary butylphenyl) pentaerythritol diphosphite, bis (2,4-dicumylphenyl) pentaerythritol diphosphite, tetra (tridecyl) isopropylidene diphenol diphosphite, tetra(tridecyl)-4,4'-n-butylidene bis (2-t-butyl-5-methylphenol) diphosphite, hexa (tridecyl)-1,1,3-tris (2-methyl-4-hydroxy-5-t-butylphenyl) butane triphosphite, tetrakis (2,4-di-t-butylphenyl) biphenylene diphosphonite, 9,10-dihydro-9-oxa-10-phosphaphenanthrene-10-oxide, 2,2'-methylenebis (4,6-t-butylphenyl)-2-ethylhexyl phosphite, 2,2'-methylenebis (4,6-t-butylphenyl)-octadecyl phosphite, 2,2'-ethylidene bis (4,6-di-t-butylphenyl) fluorophosphite, tris (2-[(2,4,8,10-tetrakis t-butyl dibenzo [d,f][1,3,2] dioxaphosphepin-6-yl)oxy]ethyl) amine, 2-ethyl-2-butyl propylene glycol or 2,4,6-tritertiary butylphenol.

Examples of a sulfur antioxidant are dialkyl thiodipropionates such as dilauryl thiodipropionate, dimyristyl thiodipropionate, distearyl thiodipropionate or pentaerythritol tetra (β-alkyl mercaptopropionate) esters.

Examples of a UV absorber are 2-hydroxybenzophenones such as 2,4-dihydroxybenzophenone, 2-hydroxy-4-methoxy benzophenone, 2-hydroxy-4-octoxybenzophenone or 5,5'-methylenebis (2-hydroxy-4-methoxybenzophenone), 2-(2'-hydroxyphenyl) benzotriazoles such as 2-(2'-hydroxy-5'-methylphenyl) benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotria zole, 2-(2'-hydroxy-5'-t-octylphenyl) benzotriazole, 2-(2'-hydroxy-3',5'-dicumyl phenyl) benzotriazole, 2,2'-methylenebis (4-t-octyl-6-(benzotriazolyl) phenol) or 2-(2'-hydroxy-3'-t-butyl-5'-carboxyphenyl) benzotriazole, benzoates such as phenyl salicylate, resorcinol monobenzoate, 2,4-di-t-butylphenyl-3,5-di-t-butyl-4-hydroxybenzoate, 2,4-di-t-amylphenyl-3,5-di-t-butyl-4-hydroxybenzoate or hexadecyl-3,5-di-t-butyl-4-hydroxybenzoate, substituted oxazanilides such as 2-ethyl-2'-ethoxyoxazanilide or 2-ethoxy-4'-dodecyloxazanilide, cyanoacrylates such as ethyl-α-cyano-β, β-diphenyl acrylate or methyl-2-cyano-3-methyl-3-(p-methoxyphenyl) acrylate, and triaryl triazines such as 2-(2-hydroxy-4-octoxyphenyl)-4,6-bis (2,4-di-t-butylphenyl)-s-triazine, 2-(2-hydroxy-4-methoxyphenyl)-4,6-diphenyl-s-triazine or 2-(2-hydroxy-4-propoxy-5-methylphenyl)-4,6-bis (2,4-di-t-butylphenyl)-s-triazine.

Examples of a hindered amine compound are 1 oxy-2,2,6,6-tetramethyl-4-hydroxypiperidine, 2,2,6,6-tetramethyl-4-piperidyl stearate, 1,2,2,6,6-pentamethyl-4-piperidyl stearate, 2,2,6,6-tetramethyl-4-piperidyl benzoate, bis (2,2,6,6-tetramethyl-4-piperidyl) sebacate, tetrakis (2,2,6,6-tetramethyl-4-piperidyl)-1,2,3,4-butane tetracarboxylate, tetrakis (1,2,2,6,6-pentamethyl-4-piperidyl)-1,2,3,4-butane tetracarboxylate, bis (2,2,6,6-tetramethyl-4-piperidyl)/di(tridecyl)-1,2,3,4-butane tetra carboxylate, bis (1,2,2,6,6-pentamethyl-4-piperidyl)/-di(tridecyl)-1,2,3,4-butane tetracarboxylate, bis (1,2,2,4,4-pentamethyl-4-piperidyl)-2-butyl-2-(3,5-di-t-butyl-4-hydroxybenzyl) malonate, 1-(2-hydroxyethyl)-2,2,6,6-tetramethyl-4-piperidinol/succinic acid diethyl polycondensate, 1,6-bis (2,2,6,6-tetramethyl-4-piperidylamino) hexane/2,4-dichloro-6-morpholino-s-triazine polycondensate, 1,6-bis (2,2,6,6-tetramethyl-4-piperidylamino) hexane/2,4-dichloro-6-t-octyl amino-s-triazine polycondensate, 1,5,8,12-tetrakis [2,4-bis (2,2,6,6-N-butyl-N-(tetramethyl-4-piperidyl) amino)-s-triazine-6-yl]-1,5,8, 12-tetraaza dodecane, 1,5,8,12-tetrakis [2,4-bis (1,2,2,6,6-N-butyl-N-(pentamethyl-4-piperidyl) amino)-s-triazine-6-yl]-1,5,8-12-tetraaza dodecane, 1,6,11-tris [2,4-bis (N-butyl-N-(2,2,6,6-tetramethyl-4-piperidyl) amino)-s-triazine-6-yl] aminoundecane or 1,6,11-tris [2,4-bis (-N-butyl-N-(1,2,2,6, 6-pentamethyl-4-piperidyl) amino)-s-triazine-6-yl] aminoundecane.

Examples of a nucleating agent are metal salts of benzoic acid, such as aluminum p-t-butyl benzoate or sodium benzoate, aromatic phosphate ester metal salts such as bis (2,4-di-t-butylphenyl) phosphate ester sodium, methylenebis (2,4-di-t-butylphenyl) phosphate ester sodium or bis [methylenebis (2,4-di-t-butylphenyl) phosphate ester] hydroxyaluminium and mixtures of an aromatic phosphate ester metal salt with an alkali metal compound, dibenzylidine sorbitols such as dibenzylidine sorbitol, bis (methylbenzylidene) sorbitol or bis (dimethylbenzylidene sorbitol), amino acid metal salts, and metal rosinates.

Examples of a heavy metal inactivator are 1,2,4-salicylamide-triazole-3-yl, bis salicylic acid hydrazide, dodecane dioyl bis (2-(2-hydroxybenzoyl) hydrazide) or bis (3-(3,5-di-t-butyl-4-hydroxyphenyl) propionic acid) hydrazide.

The hydrotalcite may be natural or synthetic, e.g., a basic compound carbonate of magnesium and aluminum, the basic compound carbonate wherein part or all of the magnesium is substituted by an alkali metal, or the basic compound wherein part or all of the carbonate anion is substituted by another anion such as perchlorate anion.

The aforementioned filler may be a filler for resin known in the art such as talc, silica, calcium carbonate, mica, glass fiber, carbon fiber, inorganic whisker such as boron nitride or potassium titanate, nano-order fine particles such as carbon nanotube or fullerene, or a reinforcing agent, and whether or not to perform surface treatment, and the particle size and shape, are selected as may be appropriate.

The synthetic resin which is rendered flameproof by the flame retardant composition of the present invention may be a polyolefin resin of an α-olefin polymer such as polypropylene, high density polyethylene, low density polyethylene, linear low density polyethylene, polybutene-1, poly-4-methyl pentene, or ethylene-vinyl acetate copolymer, ethylene-propylene copolymer and copolymers thereof; halogen-containing resin such as polyvinyl chloride, polyvinylidene chloride, polyethylene chloride, polypropylene chloride, polyvinylidene fluoride, chlorinated rubber, vinyl chloride-vinyl acetate copolymer, vinyl chloride-ethylene copolymer, vinyl chloride-vinylidene chloride copolymer, vinyl chloride-vinylidene chloride-vinyl acetate terpolymer, vinyl chloride-acrylic acid ester copolymers, vinyl chloride-maleic acid ester copolymers or vinyl chloride-cyclohexyl maleimide copolymer; petroleum resin; cumarone resin; polystyrene; polyvinyl acetate; acrylic resin; copolymer of styrene and/or α-methyl styrene with another monomer (e.g., maleic anhydride, phenylmaleimide, methyl methacrylate, butadiene, acrylonitrile etc.) (e.g., AS resin, ABS resin, MBS resin, heat-resistant ABS resin); polymethyl methacrylate, polyvinyl alcohol, polyvinylformal, polyvinylbutyral; linear polyester of polyethylene terephthalate or polytetramethylene terephthalate; polyester derived from an aliphatic dicarboxylic acid such as succinic acid and an aliphatic diol, or biodegradable aliphatic polyester such as polyglycolic acid and polylactic acid; polyphenylene oxide; polyamide such as polycaprolactam or polyhexamethylene adipamide; polycarbonate or branched polycarbonate; polyacetal; polyphenylene sulfide; polyurethane; a thermoplastic resin such as a cellulose resin or blend thereof, or a thermosetting resin such as phenol resin, urea resin, melamine resin, epoxy resin or unsaturated polyester resin.

It may also be an elastomer such as isoprene rubber, butadiene rubber, acrylonitrile-butadiene copolymer rubber, or styrene-butadiene rubber.

These synthetic resins may be single resins, or a composition of two or more thereof, and are preferably polyolefin resins.

The flame retardant composition of the invention preferably contains 70-3 weight parts, and more preferably 50-5 weight parts, per 100 weight parts of the synthetic resin, from which a flame retardant synthetic resin composition such as a flame retardant polyolefin resin composition is obtained.

The advantages offered by the invention, i.e., good dispersion of the flame retardant composition, flame resistance of the flame retardant composition, maintenance of electrical resistance and degree of anti-hygroscopic properties, differ to some extent depending on the properties of the resin, e.g., density, softening point, proportion of solvent-insolubles, degree of stereoregularity, presence or absence of residual catalyst, type and blending proportion of the olefin which is the starting material and type of polymerization catalyst (e.g., Ziegler catalyst, metallocene catalyst), but the invention is effective in all cases.

The synthetic resin composition which is rendered flameproof by the flame retardant composition of the present invention, regardless of the presence of the arbitrary ingredient (ingredient (C)), is preferably stabilized by a phenolic antioxidant, phosphorus antioxidant, sulfur antioxidant, UV absorber or hindered amine light stabilizer. In addition, a nucleating agent, antistatic agent, metal soap, hydrotalcite, filler, pigment, slip additive or foaming agent may be added. These resin blending agents may be for example the compounds which can be blended with the flame retardant composition given above.

EXAMPLES

The invention will now be described in more detail referring to specific examples, but the present invention is not to be construed as being limited thereby in any way.

Example 1

Examples 1-1☐1-4 and Comparative Examples 1-1☐1-3

50 weight parts of piperazine pyrophosphate (molar ratio of piperazine to pyrophosphoric acid 1:1) and 50 weight parts of melamine pyrophosphate (molar ratio of melamine to pyrophosphoric acid 2:1) were introduced into a jet mill (Seishin Industries Ltd.: Co-JET System α-mkIII), and crushed at room temperature at a nozzle pressure of 0.8 mPa and a feed rate of 500 g/hr to give a flame retardant powder. The obtained powder was stirred together with 1 weight part of a surface treatment agent (TABLE 1) using a Henschel mixer (Mitsui Mining Co., Ltd.: FM20C/I) at 120° C. at 2800 rpm for 10 minutes, and a silicone oil-coated flame retardant was thereby obtained.

The obtained powder was subjected to ultrasonic treatment in a methanol solvent, the average particle size was measured by a particle size measuring apparatus (Shimadzu Laboratories Ltd.: SALD-2100), and taken as the primary particle diameter. The fluidity of a flame retardant powder which had not received ultrasonic treatment was evaluated from the screen passing ratio (units:weight %) when 200 g of the powder was passed through a 60 mesh screen. Anti-hygroscopic properties were also evaluated from the weight increase after storing at 50° C., relative humidity 100% for 1 week.

TABLE 1 shows the results.

TABLE 1

|  | Example | | | | Comparative Example | | |
| --- | --- | --- | --- | --- | --- | --- | --- |
|  | 1-1 | 1-2 | 1-3 | 1-4 | 1-1 | 1-2 | 1-3 |
| KF-96-20cs*[1] (weight parts) | 1 | — | — | — | — | — | — |
| KF-96-500cs*[2] (weight parts) | — | 1 | — | — | — | — | — |
| KF-96-3000cs*[3] (weight parts) | — | — | 1 | — | — | — | — |
| KF-99*[4] (weight parts) | — | — | — | 1 | — | — | — |
| KF-96H-10000cs*[5] (weight parts) | — | — | — | — | — | 1 | — |
| KR-TTS*[6] (weight parts) | — | — | — | — | — | — | 1 |
| Primary particle diameter (μm) | 7.31 | 7.59 | 7.82 | 4.12 | 8.60 | 8.80 | 4.83 |
| Screen passing ratio (%) | 82.0 | 65.0 | 51.0 | 97.5 | 13.0 | 15.0 | 26.7 |
| Weight increase (%) | 4.65 | 4.85 | 4.99 | 4.79 | 10.74 | 7.32 | —*[7] |

*[1]Dimethylpolysiloxane (dimethyl silicone oil), (Shin-Etsu Chemical Co., Ltd.: viscosity = 20 mm$^2$/s)
*[2]Dimethylpolysiloxane (dimethyl silicone oil), (Shin-Etsu Chemical Co., Ltd.: viscosity = 500 mm$^2$/s)
*[3]Dimethylpolysiloxane (dimethyl silicone oil), (Shin-Etsu Chemical Co., Ltd.: viscosity = 3000 mm$^2$/s)
*[4]Methylhydrogen polysiloxane (Shin-Etsu Chemical Co., Ltd.: viscosity = 20 mm$^2$/s)
*[5]Dimethylpolysiloxane (dimethyl silicone oil), (Shin-Etsu Chemical Co., Ltd.: viscosity = 10000 mm$^2$/s)
*[6]Titanate surface treatment agent (Prenact (KR-TTS)), (Ajinomoto Fine-Techno Co., Ltd.: viscosity = 70 mm$^2$/s)
*[7]Not measured By comparing Examples 1-1□1-4 and Comparative Example 1-1, it is seen that powder properties are improved due to addition of the silicone oil. In addition, from Examples 1-1□1-4 and Comparative Example 1-2, it is seen that when the viscosity is 5000 mm$^2$/s or more (10000 mm$^2$/s), there is little improvement of powder properties and hygroscopic properties, and even if the average particle size of primary particles is small, the screen passing ratio is low, hence secondary aggregation cannot be suppressed unless a low viscosity silicone oil is used. Further, from Comparative Example 1-3, it is seen that even if the viscosity is low, if another surface treatment agent such as a titanate is used, there is little improvement of powder properties and anti-hygroscopic properties.

Example 2

Effect of Combining Silicone Oils Examples 2-1~2-7

50 weight parts of the piperazine pyrophosphate and 50 weight parts of the melamine pyrophosphate used in Example 1 were introduced into a jet mill (Seishin Industries Ltd.: Co-JET System α-mkIII), and crushed at room temperature at a nozzle pressure of 0.8 mPa and a feed rate of 500 g/hr to give a flame retardant powder. The obtained powder was stirred together with 0.2-0.6 weight part of a surface treatment agent (TABLE 2) using a Henschel mixer (Mitsui Mining Co., Ltd.: FM20C/I) under nitrogen atmosphere at 150° C. at 2800 rpm for 10 minutes, and a silicone oil-coated flame retardant was thereby obtained.

The obtained silicone oil-coated flame retardant was dispersed in methanol (concentration 0.3 g/100 ml methanol), subjected to ultrasonic treatment (Branson Co. desktop type, room temperature, 10 minutes), and a particle size distribution measurement was performed (Shimadzu Laboratories Ltd.: SALD-2100). The average particle size was taken as the primary particle diameter.

The fluidity of a flame retardant powder which had not received ultrasonic treatment was evaluated from the screen passing ratio when 200 g of the powder was passed through a 60 mesh screen. In addition, anti-hygroscopic properties were evaluated from the change in screen passing ratio after storing at 50° C., relative humidity 100% for 4 hours, 8 hours and 20 hours.

3 g of the flame retardant powder which had not received ultrasonic treatment was dropped from a triangular filter funnel of diameter 5.6 cm fixed at a height of 40 cm, as shown in FIG. 1, and the weight of flame retardant composition which could not be recovered on a Petri dish was taken as the splash degree. If the splash degree is high, dust tends to be produced when the material is introduced into the hopper of a molding machine or the like and the working environment is adversely affected, therefore a flame retardant composition having a low splash degree is preferred.

TABLE 2 shows the results.

TABLE 2

|  | Example | | | | | | |
| --- | --- | --- | --- | --- | --- | --- | --- |
|  | 2-1 | 2-2 | 2-3 | 2-4 | 2-5 | 2-6 | 2-7 |
| KF-96-200cs*[8] | 0.6 | | 0.2 | 0.3 | 0.4 | 0.2 | 0.5 |
| KF-99*[4] | | 0.6 | 0.4 | 0.3 | 0.2 | 0.2 | 0.5 |
| Primary particle diameter (μm) | 9.97 | | 7.82 | 4.12 | 8.60 | 8.80 | 4.83 |
| Screen passing ratio (%) | 95 | 98 | 97 | 97 | 95 | 93 | 95 |
| Screen passing ratio after 4 hrs (%) | 26 | 97 | 97 | 95 | 95 | 64 | 95 |
| Screen passing ratio after 8 hrs (%) | 19 | 97 | 95 | 93 | 92 | 63 | 94 |
| Screen passing ratio after 20 hrs (%) | 9 | 96 | 93 | 92 | 90 | 48 | 94 |
| Splash degree (%) | 25 | 92 | 12 | 11 | 9 | 29 | 10 |

*[8]dimethyl siloxane oligomer (Shin-Etsu Chemical Co. Ltd.: viscosity = 200 mm$^2$/s)
*[4]methylhydrogen polysiloxane (Shin-Etsu Chemical Co. Ltd.: viscosity = 20 mm$^2$/s)

From Example 2, it is seen that by using the silicone oil having only a methylhydrogen siloxane structure together with a silicone oil having only a dimethylsiloxane structure, a flame retardant composition satisfying the dual requirements of anti-hygroscopic properties and splash degree (working environment properties) can be obtained.

Example 3

Modified Silicone Oils Examples 3-1□3-5

50 weight parts of the piperazine pyrophosphate and 50 weight parts of the melamine pyrophosphate used in Example 1 were introduced into a jet mill (Seishin Industries Ltd.:

Co-JET System α-mkIII), and crushed at room temperature at a nozzle pressure of 0.8 mPa and a feed rate of 500 g/hr to give a flame retardant powder. The obtained powder was stirred together with 1 weight part of a surface treatment agent (TABLE 3) using a Henschel mixer (Mitsui Mining Co., Ltd.: FM20C/I) under nitrogen atmosphere at 150° C. at 2800 rpm for 10 minutes, and a silicone oil-coated flame retardant was thereby obtained.

The obtained powder was evaluated in the same way as for Example 2.

TABLE 3 shows the results.

TABLE 3

|  | Example | | | | |
| --- | --- | --- | --- | --- | --- |
|  | 3-1 | 3-2 | 3-3 | 3-4 | 3-5 |
| X-22-2000*[9] | 1 | | | | |
| KF-102*[10] | | 1 | | | |
| KF-393*[11] | | | 1 | | |
| HMS-071*[12] | | | | 1 | |
| HMS-301*[13] | | | | | 1 |
| Primary particle diameter (μm) | 12.77 | | 7.50 | | |
| Screen passing ratio (%) | 92 | 98 | 78 | 77 | 83 |
| Screen passing ratio after 4 hrs (%) | 49 | 35 | | 37 | 47 |
| Screen passing ratio after 8 hrs (%) | 32 | 33 | | 26 | 39 |
| Screen passing ratio after 20 hrs (%) | 11 | 9 | | 17 | 29 |
| Splash degree (%) | 27 | 37 | | 21 | 33 |

*[9]Epoxy-modified siloxane oligomer (Shin-Etsu Chemical Co. Ltd.: viscosity = 190 mm$^2$/s)
*[10]Epoxy-modified siloxane oligomer (Shin-Etsu Chemical Co. Ltd.: viscosity = 4000 mm$^2$/s)
*[11]Amino-modified siloxane oligomer (Shin-Etsu Chemical Co. Ltd.: viscosity = 20 mm$^2$/s)
*[12]Methylhydrogen siloxane-dimethylsiloxane copolymer (Gelest Co.: viscosity 25-35 mm$^2$/s)
*[13]Methylhydrogen siloxane-dimethylsiloxane copolymer (Gelest Co.: viscosity 25-35 mm$^2$/s)

From Example 3, it is clear that modified silicone oils can also be applied to achieve the object of the invention.

Example 4

Examples 4-1☐4-2 and Comparative Examples 4-1☐4-2

0.2 weight parts of the flame retardant in TABLE 4, polytetrafluoroethylene (Daikin Industries Ltd.: Polyfron FA-500), 0.1 weight parts of tetrakis-(3-(3,5-di-t-butyl-4-hydroxyphenyl) propionyloxymethyl) methane, 0.1 weight parts of tris (2,4-di-t-butylphenyl) phosphite and 0.1 weight parts of calcium stearate were added to 78.5 weight parts of polypropylene (Mitsui Chemical Co. Ltd.: Mitsui Polypro J704 (melt flow index=9 g/10 min, 230° C./2.16 kgf (21.2 N)), and a film of thickness 0.1 mm was formed by T-die extrusion at 220° C.

The obtained film was cut to 20 cm×20 cm, and this was used as a test piece. The dispersion was evaluated from the degree of defects by visual observation of the test piece, i.e., no defects: 1, 1-20 defects: 2, 21-30 defects: 3, 31-50 defects: 4, 51 or more defects: 5. Also, the film was extrusion molded at 220° C., and flame retarding properties were evaluated based on UL-94.

Pellets obtained at 220° C. were injection molded at 220° C. into a sheet of thickness 1 mm to give a test piece for measuring electrical resistance. For electrical resistance, the volumetric resistivity was measured for a test piece immediately after molding, a test piece after immersion in hot water at 80° C. for 1 day and 5 days, and a test piece which had been humidified at 70° C.×100% relative humidity for 7 days and 14 days, according to 6.8: Volume resistivity test described in JIS K6723 (soft PVC compounds).

The weight increase immediately after treatment was also measured for a test piece which had been humidified at 70° C.×100% relative humidity for 14 days.

TABLE 4 shows the results.

TABLE 4

|  | Example | | Comparative Example | |
| --- | --- | --- | --- | --- |
|  | 4-1 | 4-2 | 4-1 | 4-2 |
| Flame retardant 1-3*[14] | 21 weight parts | — | — | — |
| Flame retardant 1-4*[15] | — | 21 weight parts | — | — |
| Comparison flame retardant 1-1*[16] | — | — | 21 weight parts | — |
| Comparison flame retardant 1-2*[17] | — | — | — | 21 weight parts |
| Dispersibility | 1 | 1 | 5 | 4 |
| UL-94 | V-0 | V-0 | V-1 | V-1 |
| Volume resistivity (Ω-cm) | | | | |
| Immediately after molding | 3.3 × 10$^{16}$ | 8.0 × 10$^{16}$ | 1.6 × 10$^{16}$ | 3.5 × 10$^{16}$ |
| 80° C. × 1 day | 8.9 × 10$^{15}$ | 3.1 × 10$^{16}$ | 5.4 × 10$^{14}$ | 3.9 × 10$^{15}$ |
| 80° C. × 5 days | 9.7 × 10$^{11}$ | 3.3 × 10$^{12}$ | 1.7 × 10$^{10}$ | 6.2 × 10$^{11}$ |
| 70° C. × 100% RH × 7 days | 8.8 × 10$^{15}$ | 3.9 × 10$^{16}$ | 6.5 × 10$^{15}$ | 7.8 × 10$^{15}$ |
| 70° C. × 100% RH × 14 days | 2.7 × 10$^{15}$ | 2.2 × 10$^{16}$ | 1.3 × 10$^{10}$ | 2.1 × 10$^{11}$ |
| Weight increase (%) | 2.27 | 1.54 | 4.84 | 3.20 |

*[14]Flame retardant composition obtained in Example 1-3.
*[15]Flame retardant composition obtained in Example 1-4.
*[16]Flame retardant composition obtained in Comparative Example 1-1.
*[17]Flame retardant composition obtained in Comparative Example 1-2.

From Examples 4-1, 4-2 and Comparative Example 4-1, it is seen that when a flame retardant composition treated by the addition of a low viscosity silicone oil is blended with a resin, the resin is rendered highly flame resistant, and there is not much variation of electrical properties over time. Further, from Comparative Example 4-2, it is seen that if a silicone oil having a high viscosity (10000 mm$^2$/s) is used, the flame retarding properties of the resin and maintenance of electrical properties are poor, and the suppression of weight increase due to moisture absorption is small.

Example 5

Comparative Examples 5-1~5-4

The flame retardant in TABLE 5, 0.2 weight parts of polytetrafluoroethylene (Daikin Industries Ltd.: Polyfron FA-500), 0.1 weight parts of tetrakis-(3-(3,5-di-t-butyl-4-hydroxyphenyl) propionyloxymethyl) methane, 0.1 weight parts of pentaerythritol bis (2,6-di-t-butyl-4-methylphenyl) diphosphite, 0.1 weight parts of hydrotalcite (DHT-4A: Kyowa Chemical Co.) and 1 weight part of zinc oxide were added to 78.5 weight parts of polypropylene (Mitsui Chemicals Ltd.: Mitsui Polypro J704 (melt flow index=9 g/10 min), extruded into pellets at 220° C., and then injection molded at 220° C. The flame retardant properties were evaluated based on UL-94.

TABLE 5 shows the results.

TABLE 5

|  | Example | | | |
|---|---|---|---|---|
|  | 5-1 | 5-2 | 5-3 | 5-4 |
| Flame retardant 2-2*[18] | 18 | | | |
| Flame retardant 2-3*[19] | | 18 | | |
| Flame retardant 3-1*[20] | | | 18 | |
| Flame retardant 3-3*[21] | | | | 18 |
| UL-94 | V0 | V0 | V0 | V0 |

*[18]Flame retardant composition obtained in Example 2-2.
*[19]Flame retardant composition obtained in Example 2-3.
*[20]Flame retardant composition obtained in Example 3-1.
*[21]Flame retardant composition obtained in Example 3-3.

From Example 5, it is seen that even for a flame retardant using a mixture of silicone oils or a modified silicone oil, anti-hygroscopic properties are enhanced without loss of flame retardant properties.

Example 6

No PTFE Examples 6-1~6-7

The flame retardant in TABLE 6, 0.1 weight parts of tetrakis-(3-(3,5-di-t-butyl-4-hydroxyphenyl) propionyloxymethyl) methane, 0.1 weight parts of pentaerythritol bis (2,4-di-t-butylphenyl) diphosphite, and 0.1 weight parts of calcium stearate were added to 78.5 weight parts of polypropylene (Mitsui Chemicals Ltd.: Mitsui Polypro J704, melt flow index=9 g/10 min), extruded into pellets at 220° C., and then injection molded at 220° C. The flame retardant properties were evaluated based on UL-94.

TABLE 6 shows the results.

TABLE 6

|  | Example | | | | | | |
|---|---|---|---|---|---|---|---|
|  | 6-1 | 6-2 | 6-3 | 6-4 | 6-5 | 6-6 | 6-7 |
| Flame retardant 1-2*[22] | 30 | | | | | | 21 |
| Flame retardant 1-4*[15] | | 30 | | | | | |
| Flame retardant 2-2*[18] | | | 30 | | | | |
| Flame retardant 2-3*[19] | | | | 30 | | | |
| Flame retardant 3-1*[20] | | | | | 30 | | |
| Flame retardant 3-3*[21] | | | | | | 30 | |
| UL-94 | V0 | V0 | V0 | V0 | V0 | V0 | V2 |

*[22]Flame retardant composition obtained in Example 1-2.
*[15]Flame retardant composition obtained in Example 1-4.
*[18]Flame retardant composition obtained in Example 2-2.
*[19]Flame retardant composition obtained in Example 2-3.
*[20]Flame retardant composition obtained in Example 3-1.
*[21]Flame retardant composition obtained in Example 3-3.

From Example 6, it is seen that even if polytetrafluoroethylene is not used, by selecting the blending amounts, a superior flame retardant resin composition can be obtained.

INDUSTRIAL APPLICATIONS

The synthetic resin composition which is rendered flameproof by the flame retardant composition of the invention, and its molded products, are suitable for use in various industrial fields where flameproof resin materials are required, e.g., the inner and outer fittings of vehicles such as automobiles and electrical parts such as vehicle-mounted storage batteries; coating materials, covers or chassis for electronic/electrical products; household electrical appliances such as refrigerators and air conditioners; AV equipment such as video decks; OA equipment such as facsimile machines, personal computers and printers; and portable telephones, TV games and toys.

What is claimed is:

1. A flame retardant composition comprising 1-99 weight parts of a salt of piperazine and an inorganic compound selected from among piperazine phosphate, piperazine pyrophosphate and piperazine polyphosphate, or a mixture of two or more of these piperazine salts (ingredient (A)), 99-1 weight parts of a salt of melamine and an inorganic compound selected from among melamine phosphate, melamine pyrophosphate and melamine polyphosphate, or a mixture of two or more of these melamine salts (ingredient (B)) (wherein, the sum of ingredient (A) and ingredient (B) is 100 weight parts), 0-50 weight parts of an arbitrary ingredient (ingredient (C)), and 0.01-20 weight parts of a silicone oil having a viscosity at 25° C. of 5000 mm$^2$/s or less(ingredient (D)) which is added to the composition comprising the aforementioned ingredients (A)-(C) and treats them.

2. The flame retardant composition according to claim 1, wherein the salt of piperazine and an inorganic compound (ingredient (A)) contains 80 weight percent or more of piperazine pyrophosphate, the salt of melamine and an inorganic compound (ingredient (B)) contains 80 weight percent or more of melamine pyrophosphate, and the arbitrary ingredient (C) is contained to the extent of 10 weight parts or less relative to 100 weight parts of the total amount of ingredient (A) and ingredient (B).

3. The flame retardant composition according to claim 1 or 2, wherein the silicone oil (ingredient (D)) is methylhydrogen polysiloxane.

4. The flame retardant composition according to claim 1, wherein the silicone oil (ingredient (D)) is a mixture of a silicone oil having only a methylhydrogen polysiloxane structure with a silicone oil whereof at least part has a dimethyl polysiloxane structure.

5. The flame retardant composition according to claim 1, wherein the silicone oil (ingredient (D)) has a viscosity at 25° C. of 1000 mm$^2$/s or less.

6. A flame retardant polyolefin resin composition obtained by blending 3-70 weight parts of the flame retardant composition according to claim 1 with 100 weight parts of a polyolefin resin.

7. A flame retardant polyolefin resin composition molded product obtained by molding the flame retardant polyolefin resin composition according to claim 6.

8. The flame retardant composition according to claim 2, wherein the silicone oil (ingredient (D)) is a mixture of a silicone oil having only a methylhydrogen polysiloxane structure with a silicone oil whereof at least part has a dimethyl polysiloxane structure.

9. The flame retardant composition according to claim 2, wherein the silicone oil (ingredient (D)) has a viscosity at 25° C. of 1000mm$^2$/s or less.

10. A flame retardant polyolefin resin composition obtained by blending 3-70 weight parts of the flame retardant composition according to claim 2 with 100 weight parts of a polyolefin resin.

11. A flame retardant polyolefin resin composition molded product obtained by molding the flame retardant polyolefin resin composition according to claim 10.

12. The flame retardant composition according to claim 4, wherein the silicone oil (ingredient (D)) has a viscosity at 25° C. of 1000mm²/s or less.

13. A flame retardant polyolefin resin composition obtained by blending 3-70 weight parts of the flame retardant composition according to claim 4 with 100 weight parts of a polyolefin resin.

14. A flame retardant polyolefin resin composition molded product obtained by molding the flame retardant polyolefin resin composition according to claim 13.

15. The flame retardant composition according to claim 12, wherein the silicone oil (ingredient (D)) is methylhydrogen polysiloxane.

16. The flame retardant composition according to claim 13, wherein the silicone oil (ingredient (D)) is methylhydrogen polysiloxane.

17. A flame retardant polyolefin resin composition obtained by blending 3-70 weight parts of the flame retardant composition according to claim 15 with 100 weight parts of a polyolefin resin.

18. A flame retardant polyolefin resin composition obtained by blending 3-70 weight parts of the flame retardant composition according to claim 16 with 100 weight parts of a polyolefin resin.

19. The flame retardant composition according to claim 1, which contains 0 weight parts of an arbitrary ingredient (ingredient (C)).

* * * * *